United States Patent
Dettloff

(10) Patent No.: US 10,920,890 B2
(45) Date of Patent: Feb. 16, 2021

(54) AIR FLOW LEAKAGE CONTROL VIA NEW VALVE GEAR DESIGN AND ASSEMBLY PROCESS

(71) Applicant: DENSO International America, Inc., Southfield, MI (US)

(72) Inventor: Ian Dettloff, Livonia, MI (US)

(73) Assignee: DENSO International America, Inc., Southfield, MI (US)

( * ) Notice: Subject to any disclaimer, the term of this patent is extended or adjusted under 35 U.S.C. 154(b) by 0 days.

(21) Appl. No.: 16/295,386

(22) Filed: Mar. 7, 2019

(65) Prior Publication Data

US 2020/0284353 A1 Sep. 10, 2020

(51) Int. Cl.
| | | |
|---|---|---|
| *F16K 43/00* | (2006.01) | |
| *F16K 1/22* | (2006.01) | |
| *F16K 27/10* | (2006.01) | |
| *B29C 65/44* | (2006.01) | |
| *B29C 65/16* | (2006.01) | |
| *F16K 31/53* | (2006.01) | |
| *B29L 31/00* | (2006.01) | |

(52) U.S. Cl.
CPC .............. *F16K 1/221* (2013.01); *B29C 65/16* (2013.01); *B29C 65/44* (2013.01); *F16K 27/102* (2013.01); *F16K 31/535* (2013.01); *B29L 2031/7506* (2013.01)

(58) Field of Classification Search
CPC . F16K 1/221; F16K 1/22; F16K 27/10; F16K 27/102; F16K 31/535; B29C 65/16
See application file for complete search history.

(56) References Cited

U.S. PATENT DOCUMENTS

| 4,880,207 A * | 11/1989 | Matsumoto | F02D 9/10 251/337 |
|---|---|---|---|
| 5,632,245 A * | 5/1997 | Ropertz | B29C 45/14311 123/337 |
| 6,299,545 B1 * | 10/2001 | Perry | B29C 45/14311 403/359.6 |
| 2004/0187844 A1* | 9/2004 | Torii | F02D 9/104 123/337 |
| 2004/0187920 A1* | 9/2004 | Schmidt | F16K 1/222 137/15.25 |
| 2005/0120998 A1* | 6/2005 | Kobayashi | F16D 1/0858 123/399 |
| 2006/0048748 A1* | 3/2006 | Utz | F16K 1/221 123/337 |
| 2010/0126622 A1* | 5/2010 | Koch | B65D 90/623 141/1 |
| 2014/0305405 A1 | 10/2014 | Felix et al. | |
| 2018/0066763 A1* | 3/2018 | Kokubu | F02D 11/04 |
| 2019/0277202 A1* | 9/2019 | Guiduzzi | F02D 9/107 |

FOREIGN PATENT DOCUMENTS

| DE | 19633513 A1 | 2/1998 | |
|---|---|---|---|
| DE | 19854594 A1 * | 5/2000 | ........... F02D 9/1065 |
| FR | 2992046 A1 | 12/2013 | |

* cited by examiner

*Primary Examiner* — Reinaldo Sanchez-Medina
(74) *Attorney, Agent, or Firm* — Harness, Dickey & Pierce, P.L.C.

(57) ABSTRACT

An assembly and method of assembling a butterfly control valve assembly (such as a throttle body or exhaust gas recirculation valve) having a metal valve shaft with a valve. A plastic end cap is secured into an end of the metal shaft. A plastic valve gear housing is laser welded to the end cap.

18 Claims, 3 Drawing Sheets

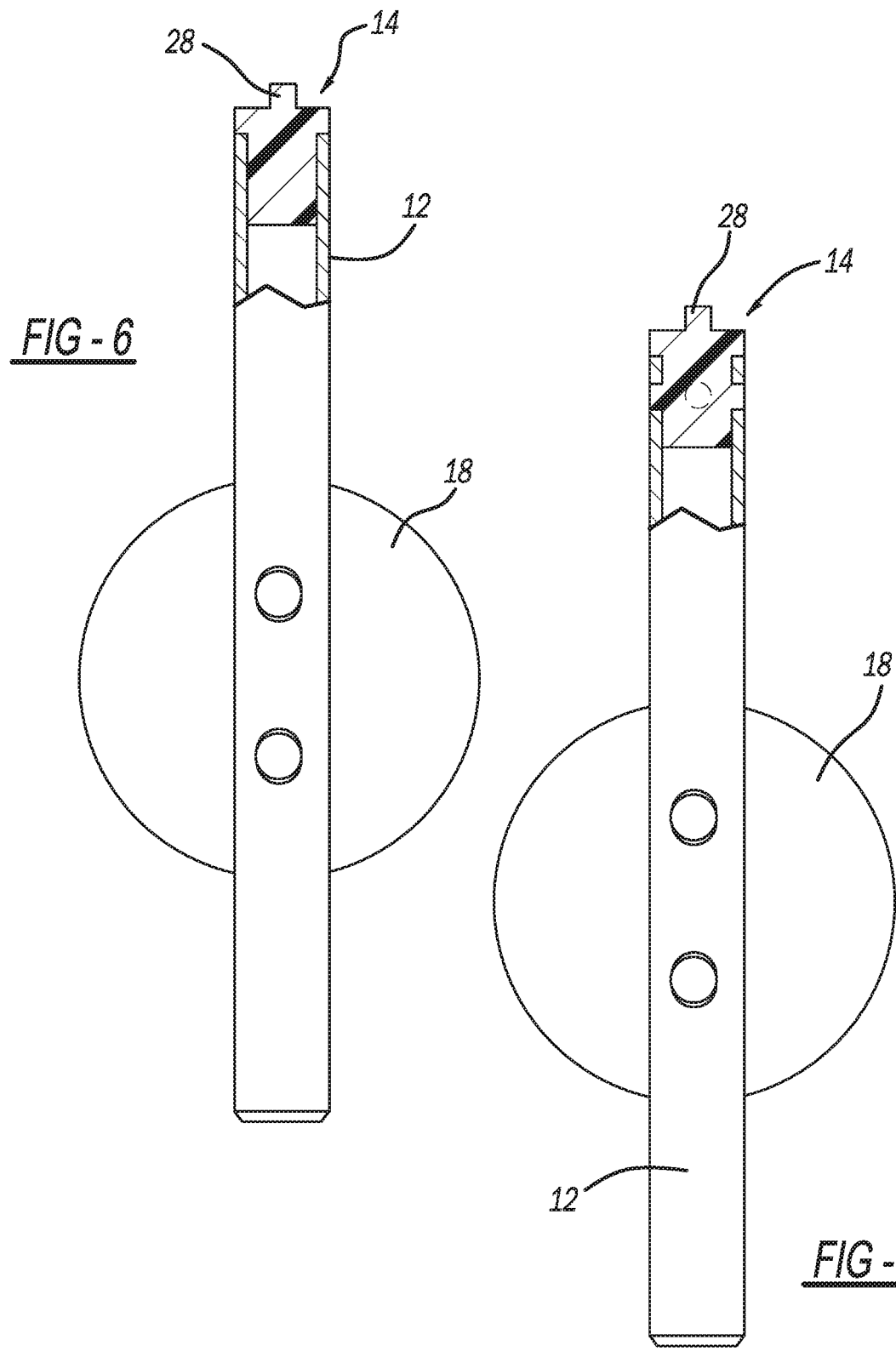

AIR FLOW LEAKAGE CONTROL VIA NEW VALVE GEAR DESIGN AND ASSEMBLY PROCESS

FIELD

Figure 1:
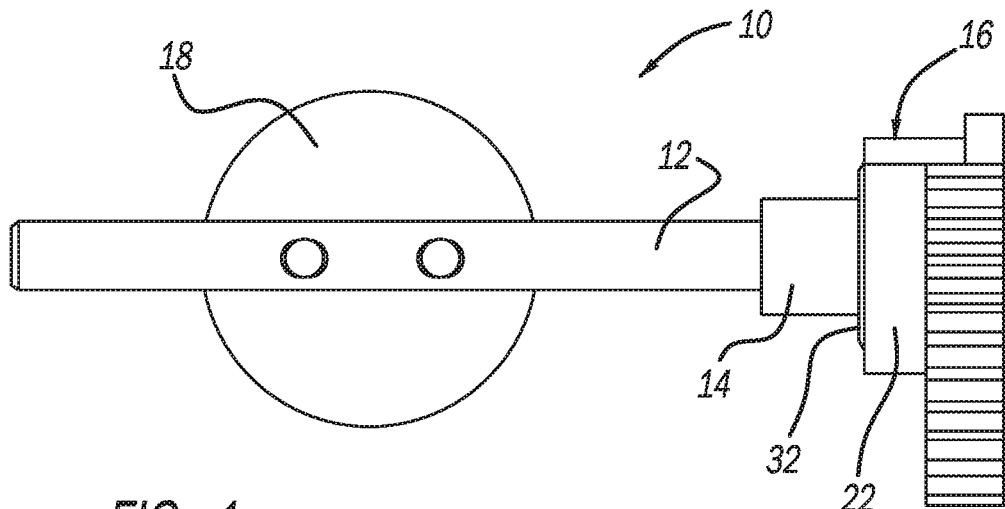

The present disclosure relates to control valves that permit passage of gas in a gas circuit and, more particularly, to a control valve that improves airflow leakage.

BACKGROUND

Various types of butterfly control valves (such as throttle bodies, exhaust gas recirculation valves, etc.) exist in the art. These valve assemblies enable the flow of gas in an automotive vehicle. In the past, these valves were assembled utilizing pressed and swaged processes or the like due to the steel interface between the shaft and the gear housing. Due to this type of connection, it is difficult to control valve clearance and leakage due to a large amount of force/vibration applied to connect the parts together. Thus, leakage exists due to the mechanical securement during the assembly process of the shaft with the gear housing.

Accordingly, it is desirable to provide a butterfly control valve assembly that provides controllable valve clearance as well as the elimination of leakage from the assembly. Thus, according to the object of the present disclosure, a shaft is provided with an end cap to enable welding of the shaft with the gear housing. The gear housing, as well as the end cap, are manufactured from a plastic material. The plastic parts can be laser welded with one another to form the valve assembly. Thus, due to the laser welding, the caulking is eliminated reducing the force of vibration applied to the parts. This, in turn, improves the leakage characteristic of the valve. Thus, the assembly process for connecting the valve gear and shaft improves the butterfly valve leak rates at a fully closed position through better controlled process of the manufacturing assembly. The valves may be utilized for butterfly valves such as throttle bodies, exhaust gas recirculation valves or the like.

SUMMARY

According to a first aspect of the disclosure, a method of assembling a butterfly control valve assembly comprises the steps of providing a metal valve shaft with a valve. A plastic end cap is secured onto an end of the metal shaft. A plastic gear housing is provided. The end cap is laser welded with the gear housing to provide a butterfly valve assembly. The end cap includes a disc-shaped securement surface that may be flush with or extend radially outside the periphery of the shaft. A pin projects from the surface of the end cap. The end cap is overmolded onto the shaft end.

Accordingly to an additional embodiment, a butterfly control valve assembly comprises a metal shaft with two ends. A valve is attached to the shaft. A plastic end cap is secured on one end of the shaft. A plastic gear housing, including a gear sector, is secured to the end cap by a laser weld. The end cap includes a disc-shaped surface with a pin projecting from the disc-shaped surface. The housing includes an aperture to receive the pin. The end cap is overmolded onto the shaft end. The shaft end may include one or more apertures to receive the overmolding. Also, the end cap has a disc-shaped surface that may be flush with or extend radially beyond the periphery of the shaft. The laser weld has a closed configuration.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Figure 2:
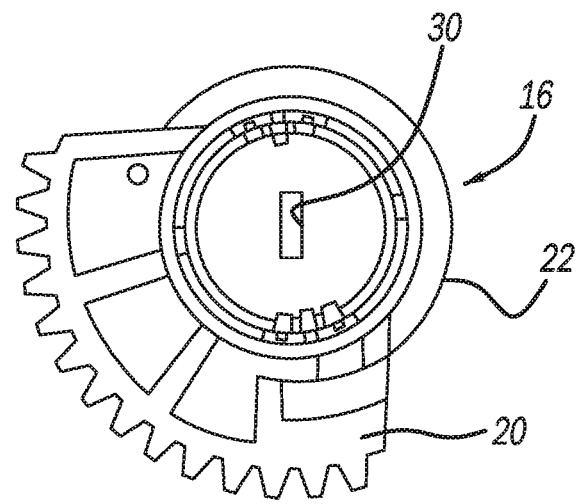
Figure 3:
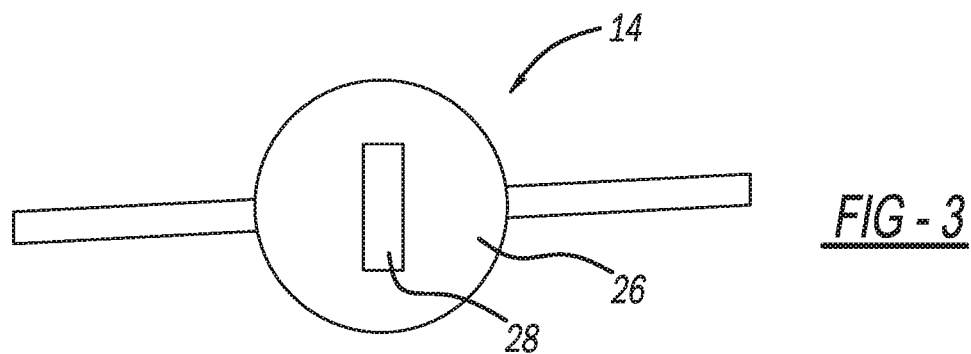
Figure 4:
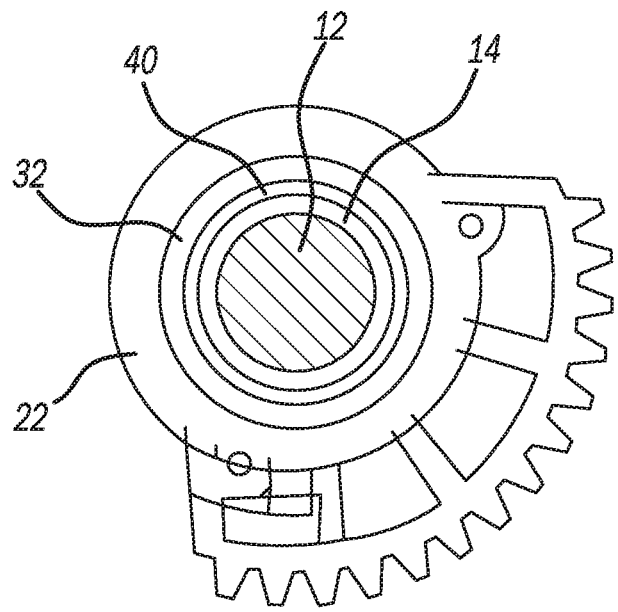
Figure 5:
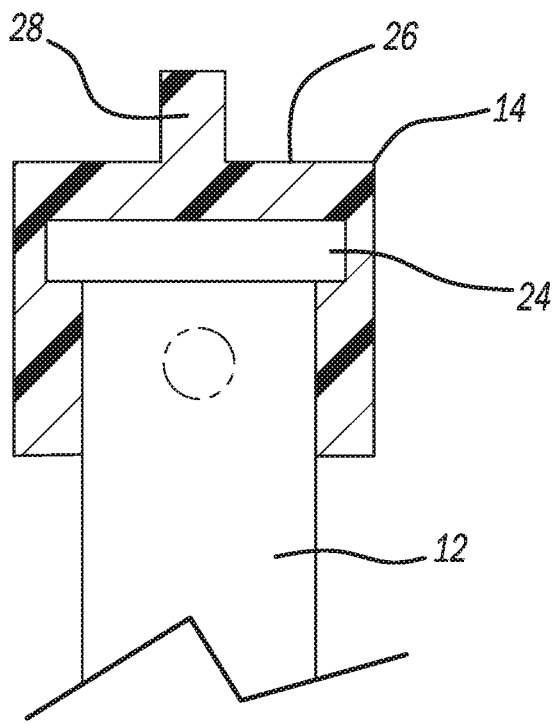

FIG. 1 is an elevation view of the valve assembly.
FIG. 2 is an elevation view of the gear housing.
FIG. 3 is an elevation view of the end cap.
FIG. 4 is an elevation view of the laser weld on the assembly.
FIG. 5 is a cross-sectional view of an end cap assembly.
FIG. 6 is a cross-sectional view of an end cap assembly.
FIG. 7 is a cross-sectional view of an end cap assembly.

DETAILED DESCRIPTION

Example embodiments will now be described more fully with reference to the accompanying drawings.

Turning to the figures, a butterfly valve assembly is illustrated and designated with the reference numeral 10. The butterfly valve assembly 10 is installed within the butterfly control valve assembly housing (which is not shown). The assembly 10 includes a shaft 12, end cap 14, gear section 16 and valve 18. The valve 18 is generally a metallic disc that is secured to the shaft via fasteners.

The gear housing 16 is associated with a motor (not shown) that rotates the gear sector 20 that, in turn, moves the valve 18 from an open to a closed position. The gear housing 16 includes a housing 22 that receives various control features such as sensors, magnets or the like to enable the determination of the position of the valve 18. The housing 22 is made from a plastic material to enable the housing 22, as well as the gear sector 20, to be injection molded as an integral part.

The end cap 14 can be overmolded on top of or inside of the shaft 12. With an end cap 14 on the outside of the shaft 12, a flange 24, or the like, may be at the end of the shaft 12. The plastic end cap 14 is overmolded over top of the shaft flange 24 as illustrated in FIG. 5. The end cap 14 includes a disc-shaped surface 26 that includes a pin 28 projecting from it. The pin 28 is received in an aperture 30 in the housing 22. Generally, the pin 28, as well as the aperture 30, have an overall rectangular configuration. This enables specific positioning of the shaft 12 with respect to the gear housing 22 which, in turn, positions the valve 18. Note that any type of polygonal or circular shape could be used. Thus, when the valve assembly 10 is assembled, the valve 18 will align in the circuit at an open and closed position.

The end cap pin 28 is inserted into the housing aperture 30. The housing 22 includes a raised flat surface 32 to align or seat with the end cap surface 26. A laser weld interface area is created at the intersection of the parts. A laser weld 40 is applied to the plastic end cap 14 and housing 22. The weld 40 generally has a circular configuration or another closed configuration may be utilized. Thus, due to the laser weld between the two parts, the leakage rate of the valve 18 can be better controlled. This is due in part to an elimination of the roll caulking between metal darts. Thus, a controlled process can be utilized for better positioning the shaft 12 onto the gear housing 22. This provides better alignment of the valve 18 in its circuit.

Additionally, the shaft 12 may include a bore as illustrated in phantom in FIG. 5. Here, the plastic would pass through the bore and enhance securement of the end cap 14 with the shaft 12.

Turning to FIGS. 6 and 7, additional end cap configurations are illustrated. In FIG. 6, the end cap 14 is positioned inside of the shaft 12. In FIG. 7, the end cap 14 is molded inside of the shaft 12 wherein the shaft has one or more bores to receive the plastic as it is molded into the shaft 12.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method of assembling a butterfly control valve assembly comprising the steps of:
   providing a metal valve shaft with a butterfly valve;
   securing a plastic end cap with an end of the metal shaft;
   providing a coupler on the end cap, the coupler including a corner;
   providing a plastic valve gear housing with a reciprocal coupler;
   coupling the end cap coupler and reciprocal coupler into specific alignment;
   laser welding the plastic end cap with the plastic valve gear housing; and
   providing the butterfly control valve assembly.

2. The method of claim 1, wherein the end cap includes a disc-shaped securement surface.

3. The method of claim 1, further comprising inserting the coupler, comprised of a pin, on the end cap into the reciprocal coupler, comprised of an aperture, on the housing.

4. The method of claim 2 further comprising laser welding around the disc-shaped securement surface.

5. The method of claim 1, further comprising overmolding the end cap onto the shaft end.

6. The method of claim 2, wherein the disc-shaped surface extends radially beyond the periphery of the shaft.

7. The method of claim 2, wherein the disc-shaped surface is flush with the periphery of the shaft.

8. A butterfly control valve assembly comprising:
   a metal shaft having two ends and a butterfly valve;
   a plastic end cap secured on one end of the shaft;
   a plastic gear housing including a gear section; and
   an alignment device including a corner portion coupling the end cap with the gear housing for positioning the butterfly valve;
   the gear housing and the end cap including a laser weld securing them together.

9. The butterfly control valve assembly of claim 8, wherein the end cap includes a disc-shaped surface.

10. The butterfly control valve assembly of claim 9, wherein the alignment device including an integral pin projects from the disc-shaped surface.

11. The butterfly control valve assembly of claim 10, wherein the housing includes an aperture to receive the pin.

12. The butterfly control valve assembly of claim 8, wherein the end cap is overmolded on the shaft end.

13. The butterfly control valve assembly of claim 12, wherein the shaft end includes one or more apertures to receive the overmold end cap.

14. The butterfly control valve assembly of claim 12, wherein the end cap has a disc-shaped surface extending radially beyond the periphery of the shaft.

15. The butterfly control valve assembly of claim 12, wherein the end cap has a disc-shaped surface flush with the periphery of the shaft.

16. The butterfly control valve assembly of claim 9, wherein the laser weld has a closed configuration.

17. The butterfly control valve assembly of claim 10, wherein the pin and aperture have a polygonal shape.

18. The butterfly control valve assembly of claim 10, wherein the pin and aperture have a circular or cylindrical shape.

* * * * *